United States Patent
Banks

(10) Patent No.: US 6,682,250 B2
(45) Date of Patent: Jan. 27, 2004

(54) POSITION-ADJUSTABLE FASTENING APPARATUS AND METHOD

(75) Inventor: Johnny E. Banks, Venus, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/045,268

(22) Filed: Nov. 7, 2001

(65) Prior Publication Data

US 2003/0086758 A1 May 8, 2003

(51) Int. Cl.[7] .................................................. F16B 2/18
(52) U.S. Cl. ...................... 403/4; 403/409.1; 403/374.1
(58) Field of Search ........................... 403/3, 4, 83, 84, 403/108, 191, 342, 343, 359.1, 359.2, 367, 368, 370, 374.1, 374.2, 409.1, DIG. 8; 411/537, 540, 352, 353, 383, 539

(56) References Cited

U.S. PATENT DOCUMENTS

| 4,172,410 A | | 10/1979 | Reynolds et al. |
| 4,444,225 A | | 4/1984 | Palau et al. |
| 4,882,825 A | | 11/1989 | Nakamura |
| 5,104,141 A | * | 4/1992 | Grove et al. ................. 403/4 |
| 5,272,930 A | | 12/1993 | Nakamura et al. |
| 5,598,631 A | | 2/1997 | Umezawa et al. |
| 5,781,966 A | | 7/1998 | Ferrari et al. |
| 5,918,645 A | | 7/1999 | Froment et al. |
| 5,954,621 A | | 9/1999 | Joutras et al. |

FOREIGN PATENT DOCUMENTS

EP 794307 A1 * 9/1997

* cited by examiner

Primary Examiner—John R. Cottingham
Assistant Examiner—Ryan M. Flandro
(74) Attorney, Agent, or Firm—Williams, Morgan & Amerson

(57) ABSTRACT

A position-adjustable fastening apparatus capable of maintaining a position of a first member with respect to a second member includes a cam receiver disposed in a bore of the first member, a cam disposed in a bore of the cam receiver, and a fastener disposed in the bore in the cam. A method for fastening a first member and a second member positioning the first member with respect to the second member, orienting a cam receiver with respect to a bore in the first member, and placing the cam receiver in the bore of the first member. The method further includes orienting a cam with respect to a bore in the cam receiver, placing the cam in the bore in the cam receiver, and engaging the fastener with the second member through the bore in the cam.

25 Claims, 7 Drawing Sheets

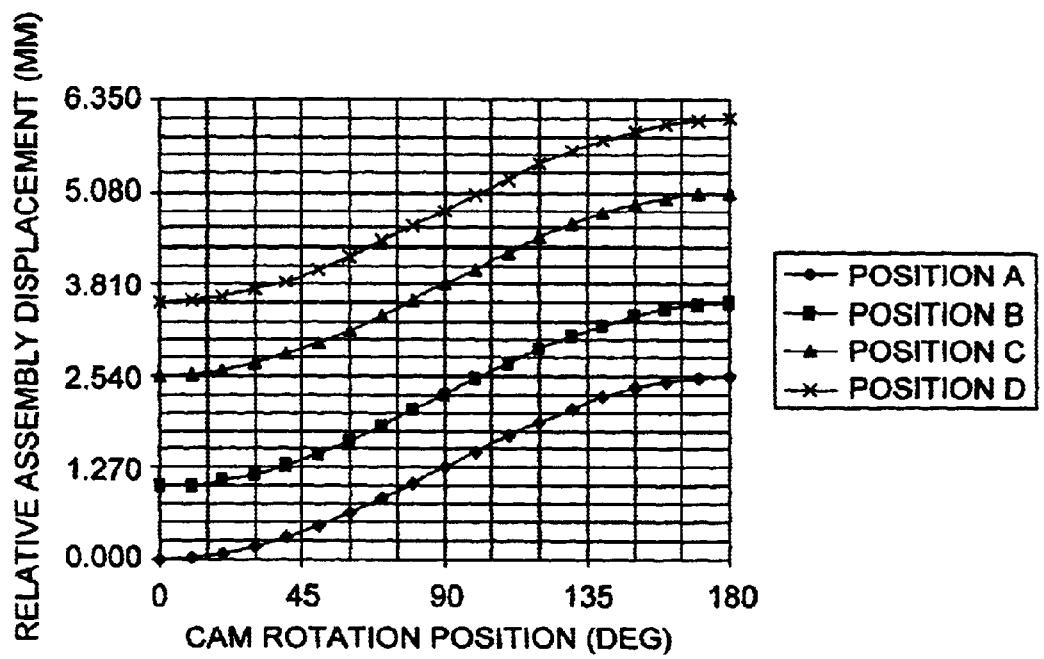
FIG. 10
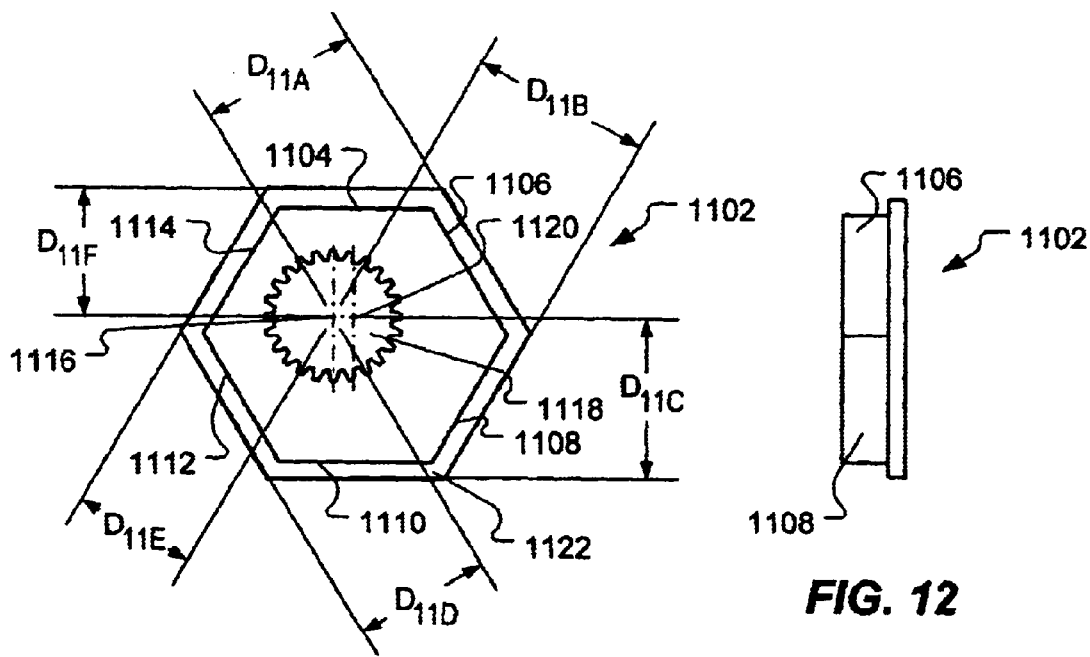
FIG. 11
FIG. 12

POSITION-ADJUSTABLE FASTENING APPARATUS AND METHOD

BACKGROUND OF THE INVENTION

1. Field of the Invention

This invention relates to a method and apparatus for adjustably positioning a part relative another part.

2. Description of the Related Art

Mechanical assemblies often include parts or subassemblies that are positioned relative to one another, and, in certain situations, it is desirable for these parts or subassemblies to be adjustably positioned relative to one another. In other words, it may be desirable for a position of a part to be adjustable relative to a feature of another part. For example, as illustrated in FIG. 1, a rail 100 may be attached to a base 102 via supports 104, 106, 108. The rail 100, as illustrated in FIG. 1, is not straight, i.e., the rail 100 is not parallel to a straight reference line 110. Accordingly, as a carriage 112 travels along the length of the rail 100, a distance from a top surface 114 of the carriage 112 to the reference line 110 varies, as illustrated by distances $D_{1A}$, $D_{1B}$ and $D_{1C}$. Further, an angle between the top surface 114 of the carriage 112 and the reference line 110 varies, as illustrated by angles $a_{1A}$ and $a_{1B}$.

Typically, the situation illustrated in FIG. 1 is not acceptable, as it is usually desirable for the distance between the top surface 114 of the carriage 112 and the reference line 110 to be constant, within a predetermined tolerance, as the carriage 112 travels along the rail 100. Further, it is generally desirable for the angle between the top surface 114 of the carriage 112 and the reference line 110 to be constant, within a predetermined tolerance, as the carriage 112 travels along the rail 100.

The ease of adjusting the rail 100 so that it is substantially parallel to the reference line 110 in the plane of FIG. 1 is generally related to the means used to attach the rail 100 to the base 102. FIG. 1 illustrates two ways of attaching the rail 100 to the base 102. Supports 104, 106 are one-piece supports that include a flange 116. The supports 104, 106 may be attached to the base 102 via a fastener 118 through the flange 116 and into the base 102. Support 108 includes an upper portion 120 that may be attached to the rail 100 and a lower portion 122 that may be attached to the base 102 via a fastener 124 through a flange 126. The upper portion 120 may be attached to the lower portion 122, for example, by a fastener 128 and pins 130.

FIG. 2 illustrates a conventional method of adjusting the supports 102, 104, 106 to straighten the rail 100. A shim 200 may be placed between the flange 116 and a top surface 202 of the base 102 to straighten the rail 100 near the support 104. The thickness of the shim 200 raises the support 104 so that the distance $D_{2C}$ from the reference line 110 to the top surface 114 of the carriage 112 when the carriage 112 is above the support 104 is substantially equivalent to the distance $D_{2B}$ from the reference line 110 to the top surface 114 of the carriage 112 when the carriage 112 is above the support 106. To adjust the support 108, the fastener 128 and the pins 130 may be removed from the support 108 and the upper portion 120 of the support 108 may be moved downwardly relative to the lower portion 122 of the support 108 to straighten the rail 100 near the support 108 so that the distance $D_{2A}$ from the reference line 110 to the top surface 114 of the carriage 112 when the carriage 112 is above the support 108 is substantially equivalent to the distance $D_{2B}$ from the reference line 110 to the top surface 114 of the carriage 112 when the carriage 112 is above the support 106. New holes (not shown) for the fastener 128 and the pins 130 may then be match-drilled into the upper portion 120 of the support 108 and the lower portion 122 of the support 108. The upper portion 120 of the support 108 and the lower portion 122 of the support 108 are then fastened together by the fastener 128 and the pins 130.

Over time, it is common for the rail 100 to again become misaligned with the reference line 110 due to forces imparted on the rail 100; supports 104, 106, 108; and the base 102. Thus, it is also common for adjustments to be made periodically to the rail 100 to realign the rail 100 with the reference line 110. In the example illustrated in FIG. 2, a new shim 200 may be required that has a different thickness. Depending upon the positioning accuracy required, the shim 200 may have a very precise thickness tolerance, requiring the shim 200 to be machined using costly, time consuming processes. Further, as new holes are generally required for the fastener 128 and pins 130 each time the support 108 is adjusted, structural integrity of the support 108 may be compromised. It is also common for a series of adjustments to be made to the rail 100 during an adjustment procedure before the straightness of the rail 100 is deemed to be within tolerance. Each time an adjustment is made, a new shim 200 may be required and new holes for the fastener 128 and the pins 130 may be required, further amplifying the difficulties discussed above.

The present invention is directed to overcoming, or at least reducing, the effects of one or more of the problems set forth above.

SUMMARY OF THE INVENTION

In one aspect of the present invention, a position-adjustable fastening apparatus capable of maintaining a position of a first member with respect to a second member is presented. The first member defines a bore therein and the second member defines a bore therein. The position-adjustable fastener includes a cam receiver defining a grooved bore therein and including a plurality of bearing surfaces, wherein the plurality of bearing surfaces are unequally spaced from a center of the bore of the cam receiver, and the cam receiver is disposed in the bore of the first member such that at least two of the plurality of bearing surfaces are proximate the wall of the bore through the first member.

The position-adjustable fastener further includes a cam defining a bore therethrough and including a grooved outer surface, wherein the bore through the cam is eccentrically spaced from the grooved outer surface, and the cam is disposed in the opening of the cam receiver such that the grooved outer surface meshes with the grooved bore of the cam receiver. The position-adjustable fastener further includes a fastener, wherein the fastener is disposed in the bore through the cam, and the fastener engages the bore through the second member.

In another aspect of the present invention, a position-adjustable fastening apparatus capable of maintaining a position of a first object with respect to a second object, is presented including a first member defining a bore therein, wherein the first member is joined to the first object and a second member defining a bore therein, wherein the second member is joined to the second object. The position-adjustable fastening apparatus further includes a cam receiver defining a grooved bore therein and including a plurality of bearing surfaces, wherein the plurality of bearing surfaces are unequally spaced from a center of the bore of the cam receiver, and the cam receiver is disposed in the bore of the first member such that at least two of the plurality of bearing surfaces are proximate the wall of the bore through the first member.

The position-adjustable fastening apparatus further includes a cam defining a bore therethrough and including a grooved outer surface, wherein the bore through the cam is eccentrically spaced from the grooved outer surface, and the cam is disposed in the opening of the cam receiver such that the grooved outer surface meshes with the grooved bore of the cam receiver. The position-adjustable fastening apparatus also includes a fastener, wherein the fastener is disposed in the bore through the cam, and the fastener engages the bore through the second member.

In a further aspect of the present invention, a method for fastening a first member and a second member is presented. The method includes positioning the first member with respect to the second member, orienting a cam receiver with respect to a bore in the first member, placing the cam receiver in the bore in the first member, orienting a cam with respect to a bore in the cam receiver, placing the cam in the bore in the cam receiver, and engaging the fastener with the second member through the bore in the cam.

In yet a further aspect of the present invention, a position-adjustable fastening apparatus capable of maintaining a position of a first member with respect to a second member is presented. The position-adjustable fastening apparatus includes a cam receiver disposed in a first bore defined by and extending into the first member, the cam receiver including a plurality of bearing surfaces unequally distanced from a center of a grooved bore defined by and extending into the cam receiver, the bearing surfaces being positioned proximate the wall of the first bore and a cam disposed in the grooved bore of the cam receiver, the cam defining a second bore therethrough and including a grooved outer surface meshing eccentrically spaced from a center of the second bore, the grooved outer surface meshing with the grooved bore of the cam receiver. The position-adjustable fastening apparatus further includes a fastener disposed in the second bore defined by the cam and engaged with third bore defined by the second member.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 10 is a graphical illustration of relative assembly movements resulting from various orientations of an exemplary cam receiver and cam according to the first embodiment of the present invention;

FIG. 11 is a front view of a cam receiver according to a second embodiment of the present invention;

FIG. 12 is a side view of the cam receiver of FIG. 11;

Figure 1:
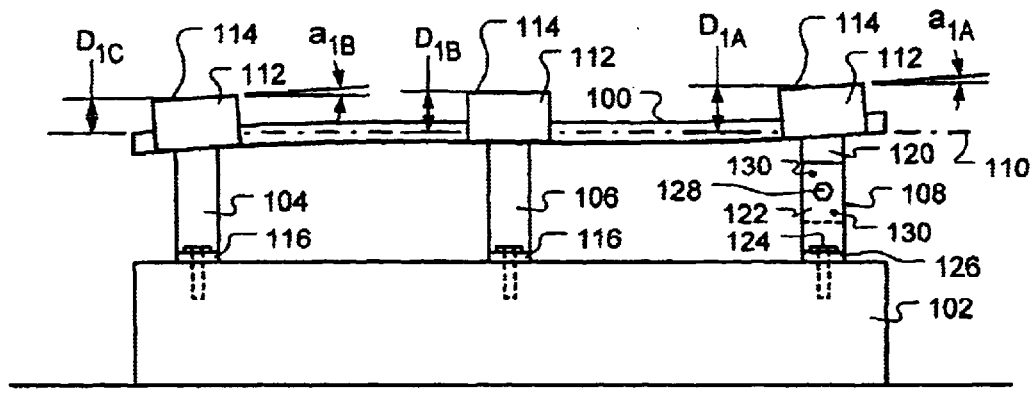
FIGS. 1 and 2 are stylized side views of a rail assembly illustrating conventional adjustment methods.
Figure 2:
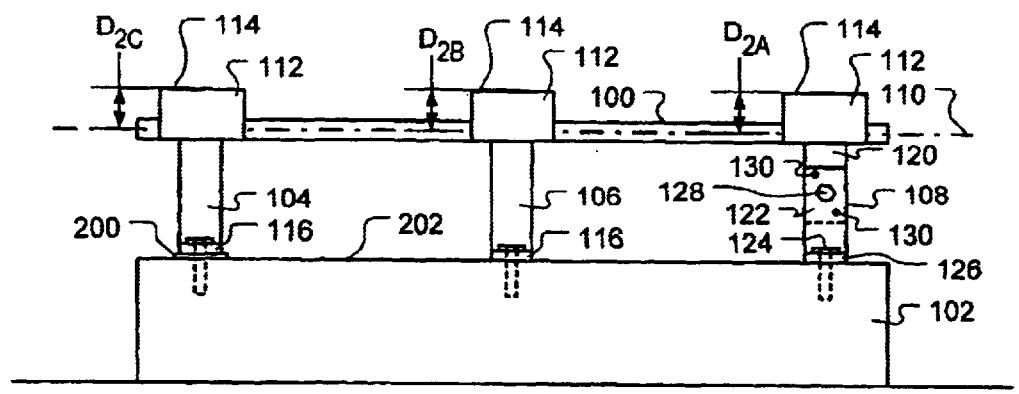

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 3:
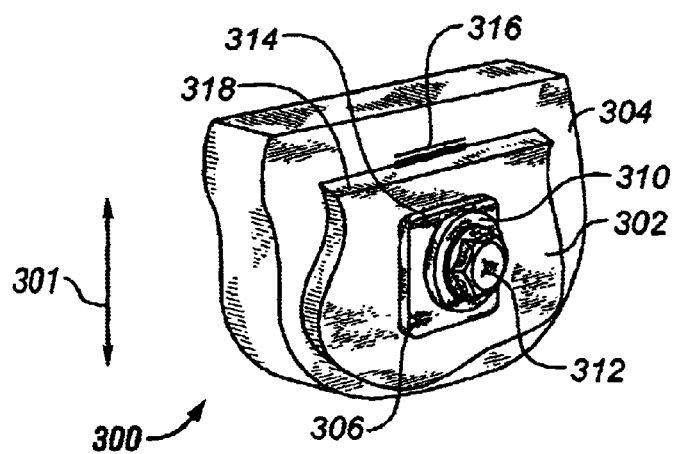
FIG. 3 is a perspective view of a first embodiment of the present invention.
Figure 4:
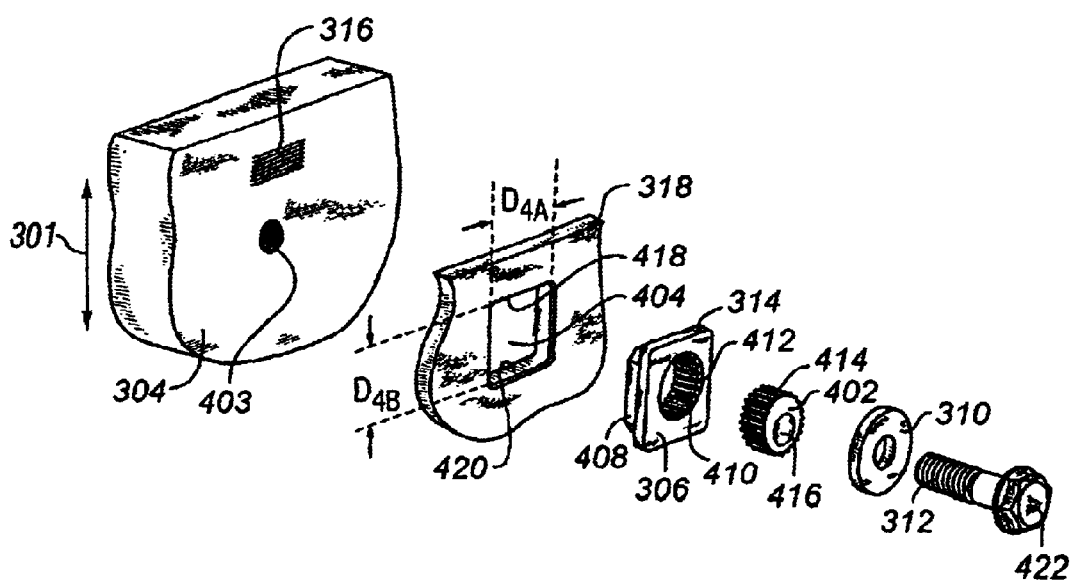
FIG. 4 is a perspective exploded view of the first embodiment of FIG. 3.

A position-adjustable fastener 300 according to a first embodiment of the present invention is illustrated in FIGS. 3–10. Referring to FIGS. 3 and 4, the position-adjustable fastener 300 allows a position of a first member 302 to be adjusted with respect to a second member 304 as indicated by an arrow 301. In the illustrated embodiment, the position-adjustable fastener 300 includes a cam receiver 306, a cam 402, a washer 310, and a threaded fastener 312. Alternatively, the first member 302 may be joined to a first object (not shown) and the second member 304 may be joined to a second object (also not shown), wherein the position-adjustable fastener also includes the first member 302 and the second member 304. The second member 304 has a threaded bore or opening 403 capable of receiving and threadably engaging the threaded fastener 312. The first member 302 includes a bore or opening 404 therethrough that has a first dimension $D_{4A}$ and a second dimension $D_{4B}$.

Figure 5:
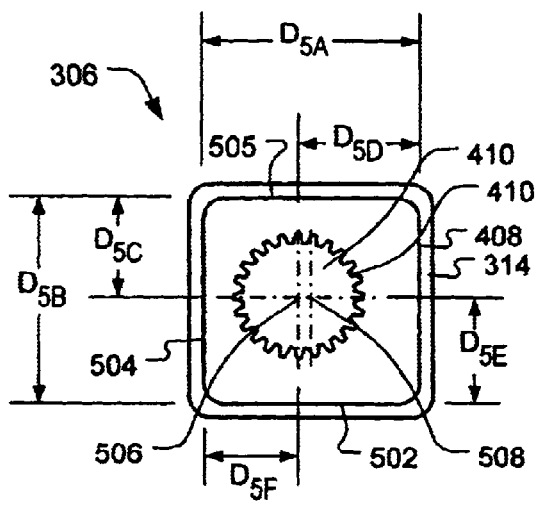
FIG. 5 is a front view of the cam receiver of FIGS. 3 and 4.
Figure 6:
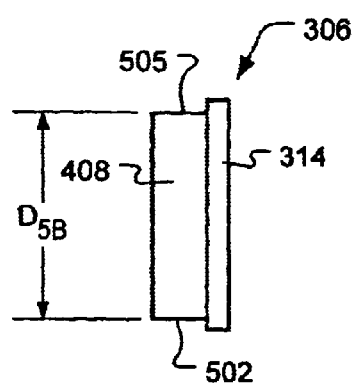
FIG. 6 is a side view of the cam receiver of FIGS. 3–5.

As shown in FIGS. 4, 5, and 6, the cam receiver 306 has a plurality of bearing surfaces 408, 502, 504, 505 disposed at approximately right angles from one another. The dimension $D_{5A}$ between the bearing surface 504 and the bearing surface 408 is substantially equivalent to the dimension $D_{5B}$ between the bearing surface 502 and the bearing surface 505. The term "substantially" as used herein means that the dimensions, distances, values, and the like are equivalent within manufacturing tolerances. Further, the term "approximately" as used herein means that the dimension, distances, and the like are equivalent to a degree that enables the invention to operate within desired tolerances. Thus, the cam receiver 306 can be placed in the opening 404 of the first member 302 in any of four orientations.

The dimension $D_{4B}$ of the opening 404 in the first member 302 may be slightly larger than either of the dimensions $D_{5A}$ or $D_{5B}$ of the cam receiver so that, when the cam receiver 306 is placed into the opening 404 of the first member 302, the fit between the cam receiver 306 and the opening 404 of the first member 302, along the dimension $D_{4B}$, maintains a predetermined locational tolerance between the cam receiver 306 and the first member 302 in directions indicated by the arrow 301. In one embodiment, the fit between the cam receiver 306 and the first member 302 is a locational fit and, in particular, is a clearance locational fit.

As is well known in the art, a locational fit is intended to determine only the location of mating parts and may provide rigid or accurate location, or may provide some freedom of location. A locational clearance fit is generally intended for parts that are normally stationary but which can be freely assembled or disassembled. For example, according to American National Standards Institute (ANSI) standard clearance locational fits, a mated pair of parts having a nominal mating dimension of 25.4 mm may have a clearance therebetween from 0.0000 mm to 0.0.0864 mm.

The cam receiver 306 further includes a bore or opening 410 therethrough and a plurality of grooves 412 (only one labeled) extending outwardly from the opening 410. Thus, the opening 410 is a grooved opening. The opening 410 is located such that dimensions $D_{5C}$, $D_{5D}$, $D_{5E}$, and $D_{5F}$ from a center 506 of the opening to each of the bearing surfaces 505, 408, 502, 504, respectively, are unequal. Thus, the center 506 the opening 410 is offset from a geometric center 508 of the cam receiver 306.

Figure 7:
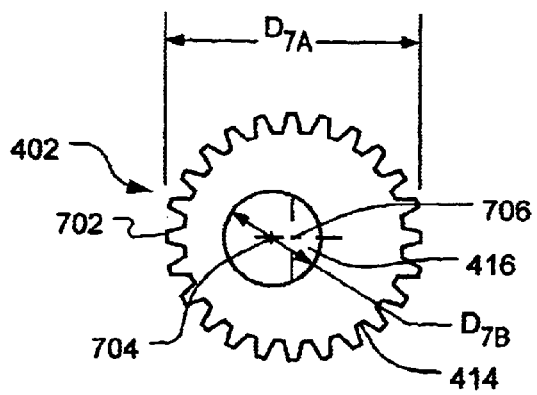
FIG. 7 is a front view of the cam of FIG. 4.

Referring now to FIGS. 4 and 7, the cam 402 includes a plurality of grooves 414 (only one labeled) extending inwardly from an outer surface 702 of the cam 402 and a bore or opening 416 extending therethrough. Thus, the outer surface 702 is a grooved outer surface. The shape of the cam 402, the dimension $D_{7A}$ of the cam 402, and the size and shape of the grooves 414 are defined so that the cam 402 can be placed in the opening 410 of the cam receiver and maintain a predetermined locational tolerance between the cam 402 and the cam receiver 306. The fit between the cam 402 and the cam receiver 306 may be a locational fit or a clearance locational fit as described above. Thus, the grooves 414 of the cam 402 are sized and shaped corresponding to the grooves 414 of the cam receiver 306 such that the grooves 414 of the cam 402 engage the grooves 412 of the cam receiver 306 to maintain a location and orientation of the cam 402 with respect to the cam receiver 306 within a predetermined tolerance.

The opening 416 of the cam 402 is eccentrically spaced from (i.e., is not concentric with) the outer surface 702 of the cam 402. Accordingly, a center 704 of the opening 416 of the cam 402 is offset from a geometric center 706 of the cam 402. The opening 416 of the cam 402 has a diameter $D_{7B}$ that is sized to maintain a predetermined locational tolerance between the cam 402 and a shoulder 418 of the threaded fastener 312. The fit between the opening 416 of the cam and the shoulder 418 of the threaded fastener 312 may be a locational fit or a clearance locational fit as described above.

Referring again to FIGS. 4 and 5, the dimension $D_{4A}$ of the opening 404 in the first member 302 is sized so that the cam receiver 306 can be placed in the opening 404 of the first member 302 in any orientation while aligning the opening 416 of the cam 402 with the threaded opening 403 in the first member. That is, the dimension $D_{4A}$ is greater than twice the dimension $D_{5D}$ as illustrated in FIG. 5, since the dimension $D_{5D}$ is greater than any of the dimensions $D_{5C}$, $D_{5D}$, or $D_{5F}$. The dimension $D_{5D}$ can be any desired value that is greater than the dimension $D_{5D}$, as there is no fit requirement between the cam receiver 306 and the opening 404 in the first member 302 in directions parallel to the dimension $D_{5D}$ (i.e., perpendicular to the directions indicated by the arrow 301).

In use, the threaded fastener 312 is placed through the washer 310, the opening 416 of the cam 402, the opening 410 of the cam receiver 306, the opening 404 in the first member 302 and is received in and engaged with the threaded opening 403 in the second member 304. The threaded fastener 312 holds the cam 402, the cam receiver 306, and the first member 302 in a fixed relationship to the second member 304 in directions indicated by the arrow 301 within a predetermined tolerance.

The cam receiver 306 illustrated in FIGS. 3–5 includes a flange 314 that, when the position-adjustable fastener 300 is installed and a head 422 of the threaded fastener 310 is in contact with the washer 310, if present, or in contact with the cam 403, if the washer 310 is omitted, holds the first member 302 proximate the second member 304. It is within the scope of the present invention, however, for the flange 314 to be omitted from the cam receiver 306. If the flange 314 is omitted from the cam receiver 306, the first member 302 is held proximate the second member 304 by other means, e.g., one or more fasteners, clamps, or the like. Further, while the illustrated embodiment includes a washer 310 and a threaded fastener 312, the scope of the present invention encompasses an embodiment wherein the washer 310 is omitted.

The present invention also encompasses any fastener that is capable of holding the cam 402 in the opening 410 of the cam receiver 306 and is capable of holding the cam receiver 306 in the opening 404 of the first member 302 in a fixed relationship to the second member 304. Yet further, while the illustrated embodiment includes the grooves 412 of the cam receiver 306 and the grooves 414 of the cam receiver 402, the scope of the present invention encompasses any feature or features of the cam receiver 306 and any feature or features of the cam 402 that are capable of maintaining the location and orientation of the cam 402 with respect to the cam receiver 306. For example, the location and orientation of the cam 402 with respect to the cam receiver 306 may be maintained by one or more keys and keyways, pins, or the like.

In the embodiment illustrated in FIGS. 3 and 4, the second member 304 has a plurality of reference marks 316 that are spaced apart from one another by a predetermined distance. As the first member 302 is moved relative the second member 304, a top surface 318 of the first member 302 may be used as a reference feature against the plurality of reference marks 316 to indicate a displacement of the first member 302 with respect to the second member 304 in the directions indicated by the arrow 301. While the plurality of reference marks 316 are illustrated, the scope of the present invention encompasses an embodiment wherein the plurality of reference marks 316 of the second member 304 are omitted as well as a first member 302 having only one reference line of the plurality of reference marks 316 illustrated in FIG. 4.

Figure 8:
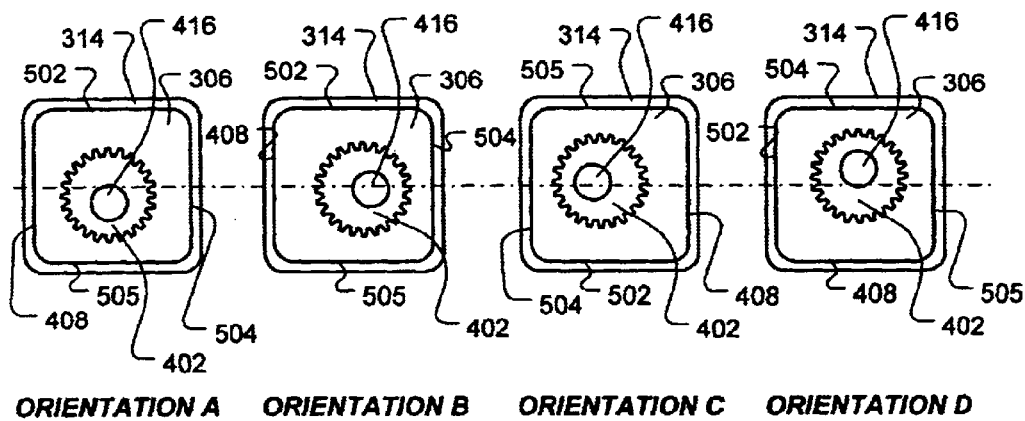
FIG. 8 is a stylized diagram illustrating various orientations of the cam receiver of FIGS. 3–6.
Figure 9:
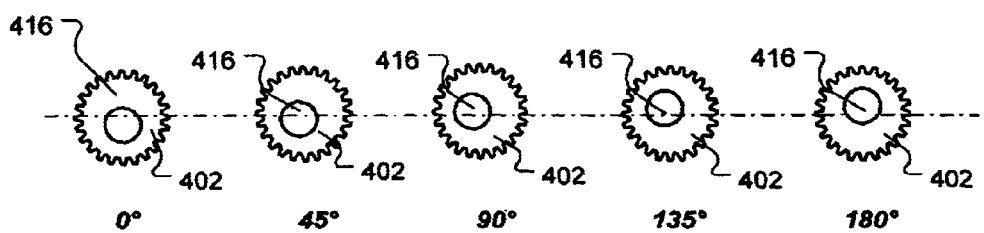
FIG. 9 is a stylized diagram illustrating various orientations of the cam of FIGS. 4 and 7.

By combining various orientations of the cam receiver 306 within the opening 404 of the first member 302 with various orientations of the cam 402 within the opening 410 of the cam receiver 306, a range of displacements or adjustments can be produced. Referring now to FIG. 8, displacements of the opening 416 resulting from various orientations of the cam receiver in the opening 404 in the first member 302 (FIGS. 3 and 4) is illustrated with respect to a reference line 802. For example, in orientation A, the bearing surface 502 is proximate the upper surface 418 of the opening 404 in the first member 302 and the bearing surface 505 is proximate the lower surface 420 of the opening 404 in the first member 302. As the cam receiver 306 is rotated from orientation A through orientation D, with no relative movement between the cam receiver 306 and the cam 402, various displacements may be produced. Further, various orientations of the cam 402 in the opening 410 of the cam receiver 306, from a zero-degree orientation through a 180-degree orientation as illustrated in FIG. 9, further displacements are produced that are finer in nature than those illustrated in FIG. 8. Rotating the cam receiver 306 and then replacing the cam receiver 306 within the opening 404 of the first member 302 produces coarse displacements or adjustments, while rotating the cam 402 and replacing the cam 402 within the opening 410 of the cam receiver 306 produces fine displacements or adjustments. Thus, combining various orientations of the cam receiver 306 within the opening 404 of the first member 302 with various orientations of the cam 402 within the opening 410 of the cam receiver 306 produces a range of displacement or adjustments. The present invention, however, encompasses only orienting either the cam receiver 306 within the opening 404 of the first member or the cam 402 within the opening 410 in the cam receiver 306 to produce the desired displacement.

The operation of the present invention will now be described in reference to FIG. 4. The first member 302 is positioned along the directions indicated by the arrow 301. If the plurality of measurement lines 316 (or only one measurement line of the plurality of measurement lines 316) is present, the first member 302 may be positioned with respect to the second member 304 according to the displacement indicated by the top surface 318 and the plurality of measurement lines 316 (or a single measurement line of the plurality of measurement lines 316). When a desired location of the first member 302 with respect to the second member 304 is achieved, the cam receiver 306 is placed into the opening 404 in the first member 302 and the cam 402 is placed into the opening 410 in the cam receiver 306 so that the opening 416 in the cam 402 can be aligned with the threaded opening 403 in the second member. Various orientations of the cam receiver 306 in the opening 404 in the first member 302 in combination with various orientations of the cam 402 in the opening 410 in the cam receiver 306 result in various displacements of the opening 416 of the cam 402 in directions indicated by the arrow 301. The cam receiver 306 can be moved relative to the first member 302 in directions parallel to the dimension $D_{4A}$ (i.e., perpendicular to the direction indicated by the arrow 301) as needed to align the opening 416 in the cam 402 with the threaded opening 403.

The relationship of the orientation of the cam receiver 306 in the opening 404 of the first member 302 and the orientation of the cam 402 in the opening 410 in the cam receiver 306 to the displacement of the opening 416 in the cam 402 is described according to the following equation:

$$D_T = \left[\left(\sqrt{\left(D_{5D} - \frac{D_{5A}}{2}\right)^2 + \left(D_{5E} - \frac{D_{5A}}{2}\right)^2}\right) \sin\left(\alpha + \tan^{-1}\left(\frac{D_{5D} - \frac{D_{5A}}{2}}{D_{5E} - \frac{D_{5A}}{2}}\right)\right)\right] + R\sin\beta$$

wherein:
$D_T$=total displacement;
$D_{5A}$, $D_{5D}$, $D_{5E}$=the dimensions provided in FIG. 5;
$\alpha$=the cam receiver angle, starting at position A (FIG. 8) increasing in a clockwise direction;
R=cam offset; and
$\beta$=the cam angle, starting at the 0° position (FIG. 9), increasing in a clockwise direction.

In an example of the first embodiment of the present invention as illustrated in FIGS. 3–9, the cam receiver 306 has the following dimensions (FIG. 5):
$D_{5A}$=25.40 mm;
$D_{5B}$=25.40 mm;
$D_{5C}$=11.91 mm;
$D_{5D}$=14.30 mm;
$D_{5E}$=13.49 mm; and
$D_{5F}$=11.13 mm;

Further, the center 704 of the opening 416 in the cam 402 is offset from the geometric center 706 of the cam 402 by 1.270 mm and the cam 402 has 36 grooves 414 spaced at 10 degree intervals. By combining various orientations of the cam receiver 306 in the opening 404 of the first member 302 with various orientations of the cam 402 in the opening 410 in the cam receiver 306, the displacements illustrated in FIG. 10 may be produced. By way of example, a displacement of 1.270 mm can be accomplished by having the cam receiver in orientation A, as shown in FIG. 8, with a 90 degree rotation of the cam 402 in the opening 410 of the cam receiver 306, as shown in FIG. 9.

A second embodiment of the present invention will now be described as related to the cam receiver 1102 illustrated in FIGS. 11 and 12. All elements of the present position-adjustable fastener except the cam receiver 1102 may be the same as described in the first embodiment. As illustrated in FIG. 11, when the cam receiver 1102 is in orientation E, the bearing surface 1108 is proximate the upper surface 418 of the opening 404 in the first member 302 and the bearing surface 1112 is proximate the lower surface 420 of the opening 404 in the first member 302. As compared to the four bearing surfaces 408, 502, 504, 505 (FIG. 5) in the first embodiment, the cam 1102 has six bearing surfaces 1104, 1106, 1108, 1110, 1112, 1114. A greater number of bearing surfaces can either provide greater resolution (i.e., finer adjustments) or a greater overall range of displacements at the same resolution. The cam receiver 1102 is used in the same way as the cam receiver 306. The cam receiver 1102 has bearing surfaces 1104, 1106, 1108, 1110, 1112, 1114 that are spaced from the center 1116 of the opening 1118 in the cam receiver 1102 by dimensions $D_{11A}$, $D_{11B}$, $D_{11C}$, $D_{11D}$, $D_{11E}$, and $D_{11F}$, respectively. The bearing surfaces 1104, 1106, 1108, 1110, 1112, 1114 are disposed approximately 60 degrees from one another. The center 1116 of the opening 1118 in the cam receiver 1102 is spaced from the geometric center 1120 of the cam receiver 1102 by dimension $D_{11G}$.

The cam receiver 1102, as illustrated in FIGS. 11 and 12, includes a flange 1122. As in the first embodiment (i.e., the cam receiver 306), it is within the scope of the present invention, however, for the flange 1122 to be omitted from the cam receiver 1102.

In an example of the second embodiment of the present invention as illustrated in FIGS. 11 and 12, and as applied to the other elements illustrated in FIG. 4, the cam receiver 1102 has the following dimensions (FIG. 11):

$D_{11A}$=12.217 mm;
$D_{11B}$=10.871 mm;
$D_{11C}$=11.354 mm;
$D_{11D}$=14.529 mm;
$D_{11E}$=14.046 mm;
$D_{11F}$=13.183 mm; and
$D_{11G}$=1.905 mm.

Figure 13:
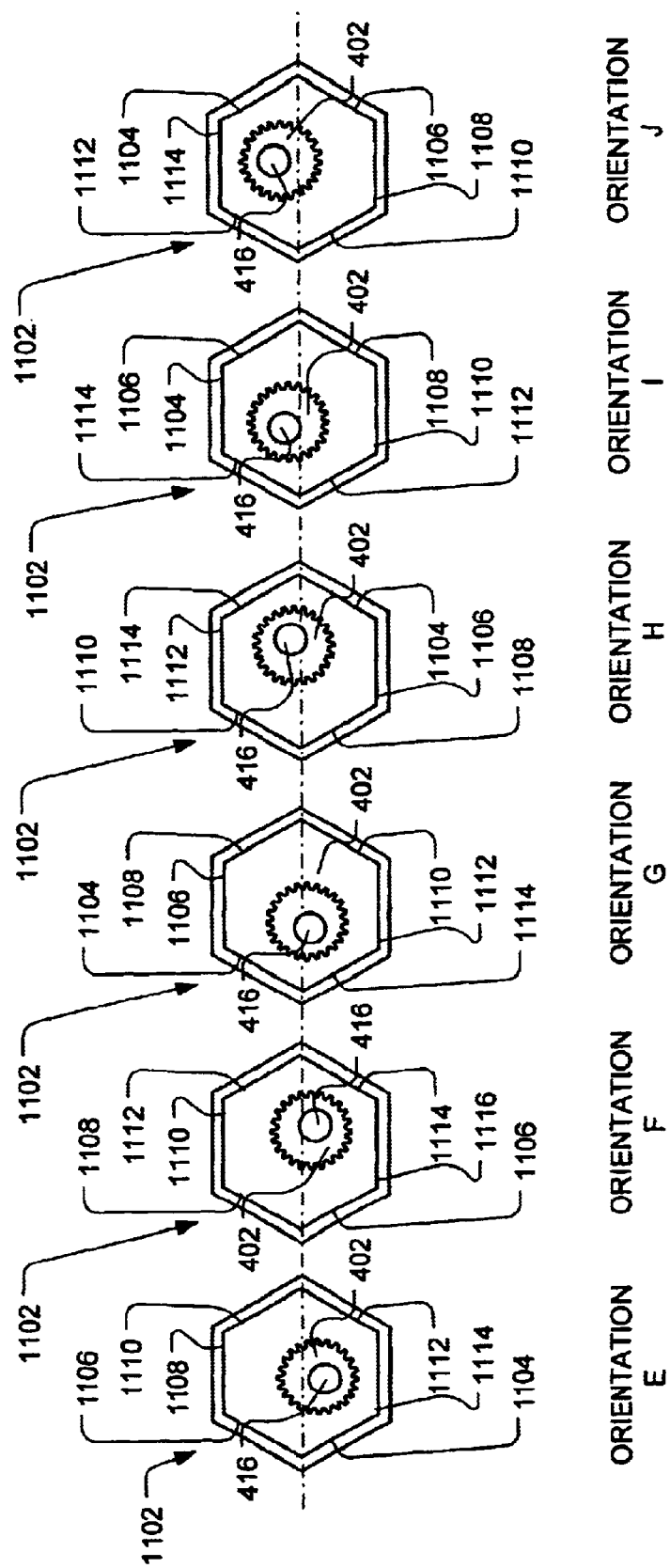
FIG. 13 is a stylized diagram illustrating various orientations of the cam receiver of FIGS. 11 and 12.
Figure 14:
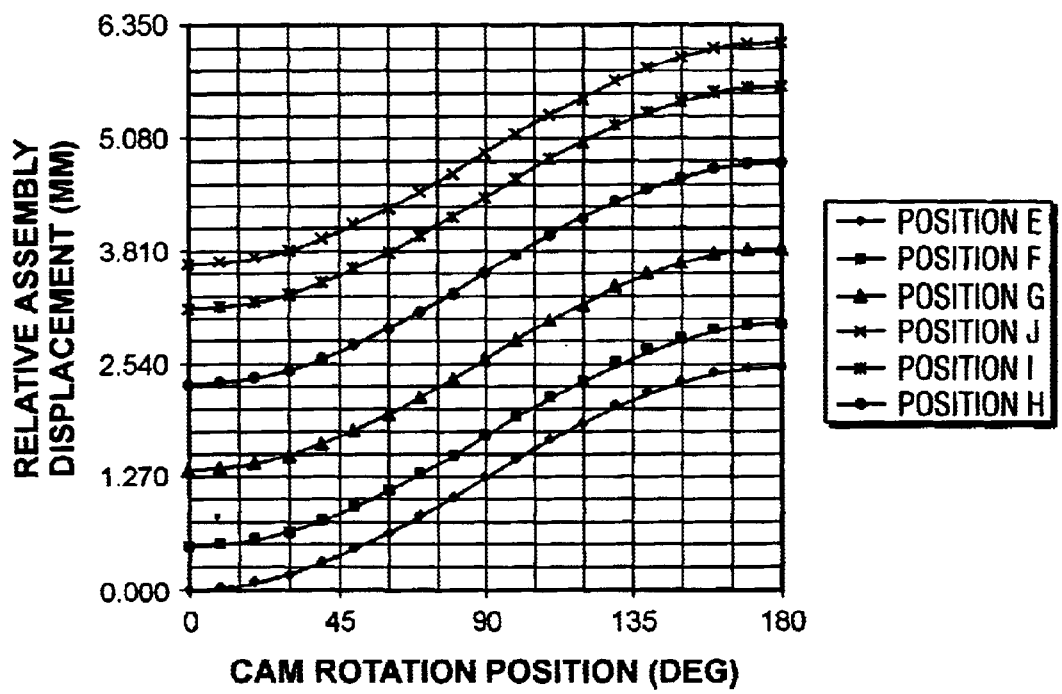
FIG. 14 is a graphical illustration of relative assembly movements resulting from various orientations of an exemplary cam receiver and cam according to the second embodiment of the present invention.

Further, the center 704 of the opening 416 in the cam 402 is offset from the geometric center 706 of the cam 402 by 0.127 mm and the cam 402 has 36 grooves 414 spaced at 10 degree intervals. By combining various orientations of the cam receiver 1102 in the opening 404 of the first member 302 with various orientations of the cam 402 in the opening 1118 in the cam receiver 1102, the displacement illustrated in FIG. 13 may be produced. By way of example, a displacement of 0.127 mm can be accomplished by having the cam receiver 1102 in orientation E, as shown in FIG. 13 with a 90 degree rotation (FIG. 9) of the cam 402 in the opening 1118 of the cam receiver 1102.

Figure 15:
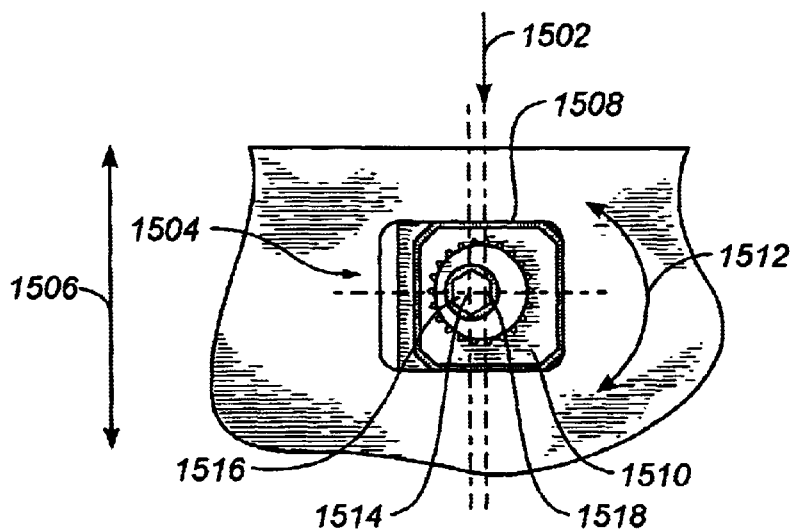
FIG. 15 is a stylized diagram of a force applied to a position-adjustable fastener according to the present invention and a moment resulting from the force.

Thus, a cam receiver can have any number of bearing surfaces (e.g., bearing surfaces 1104, 1106, and the like) so long as the position-adjustable fastener can reliably withstand forces and moments imparted on it by the load that it is restraining. There is, however, a practical limit to the number of bearing surfaces that may be employed. As illustrated in FIG. 15, the limit is affected by the magnitude of the load (represented by arrow 1502) that the position-adjustable fastener can withstand in the desired adjustment direction (represented by arrow 1506). The bearing surface 1508 of the cam receiver 1510 should have sufficient width to resist a torque (represented by arrow 1512) resulting from the center 1514 of the threaded fastener 1516 being offset from a geometric center 1518 of the cam receiver 1518. Wedging, deformation, and/or wear of the bearing surfaces of the cam receiver may become critical as the torque load increases and, thus, may define the maximum number of bearing surfaces that may be employed in the cam receiver.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A position-adjustable fastening apparatus capable of maintaining a position of a first member with respect to a second member, wherein the first member defines a bore therein and the second member defines a bore therein, the position-adjustable fastener comprising:

a cam receiver defining a grooved bore therein and including a plurality of bearing surfaces, wherein:
the plurality of bearing surfaces are unequally spaced from a center of the bore of the cam receiver, and
the cam receiver is disposed in the bore of the first member such that at least two of the plurality of bearing surfaces are proximate die wail of the bore through the first member, a cam defining a bore therethrough and including a grooved outer surface, wherein:
the bore through the earn is eccentrically spaced from the grooved outer surface, and
the cam is disposed in the opening of the cam receiver such that the grooved outer surface meshes with the grooved bore of the cam receiver; and
a fastener, wherein:
the fastener is disposed in the bore through the cam, and
the fastener engages the bore through the second member.

2. A position-adjustable fastening apparatus, according to claim 1, further comprising a washer, wherein the fastener includes a head and the fastener is disposed through the washer such that the washer is disposed between the head of the fastener and the cam.

3. A position-adjustable fastening apparatus, according to claim 1, wherein the orientation of the cam receiver with respect to the first member and the orientation of the earn with respect to the cam receiver produces a displacement according to the equation:

$$D_T = \left( \left( \sqrt{\left(D_{5D} - \frac{D_{5A}}{2}\right)^2 + \left(D_{5E} - \frac{D_{5A}}{2}\right)^2} \right) \sin\left(\alpha + \tan^{-1}\left(\frac{D_{5D} - \frac{D_{5A}}{2}}{D_{5E} - \frac{D_{5A}}{2}}\right)\right) \right) + R\sin\beta$$

wherein:
$D_T$=total displacement;
$D_{SA}$=a dimension of the earn receiver from a first surface to a second surface;
$D_{SD}$=a distance from the first surface of the cam receiver to a center of the grooved bore defined by the cam receiver;
$D_{SE}$=a distance from a third surface to the center of the grooved bore defined by the cam receiver;
α=an angular rotational position of the cam receiver increasing in a clockwise direction;
R=a distance from a center of the cam to a center of the bore defined by the earn; and
β=an angular rotational displacement increasing in a clockwise direction.

4. A position-adjustable fastening apparatus, according to claim 1, wherein the cam receiver further comprises a flange having a surface proximate the cam, wherein the flange in combination with the fastener is capable of holding the first member proximate the second member.

5. A position-adjustable fastening apparatus, according to claim 1, wherein the plurality of bearing surfaces of the cam receiver further comprises four bearing surfaces that are disposed at approximately right angles from one another.

6. A position-adjustable fastening apparatus, according to claim 1, wherein the plurality of bearing surfaces of the cam receiver further comprises six bearing surfaces that are disposed at approximately 60 degrees from one another.

7. A position-adjustable fastening apparatus, according to claim 1, further comprising an element selected from the group consisting of a fastener and a clamp for holding the first member proximate the second member.

8. A position-adjustable fastening apparatus, according to claim 1, wherein the fastener further comprises a shoulder proximate the bore in the cam.

9. A position-adjustable fastening apparatus capable of maintaining a position of a first object with respect to a second object, comprising:

a first member defining a bore therein, wherein the first member is joined to the first object;

a second member defining a bore therein, wherein the second member is joined to the second object;

a cam receiver defining a grooved bore therein and including a plurality of bearing surfaces, wherein:
  the plurality of bearing surfaces are unequally spaced from a center of the bore of the cam receiver, and
  the cam receiver is disposed in the bore of the first member such that at least two of the plurality of bearing surfaces are proximate the wall of the bore through the first member, a cam defining a bore therethrough and including a grooved outer surface, wherein:
  the bore through the cam is eccentrically spaced from the grooved outer surface, and
  the cam is disposed in the opening of the cam receiver such that the grooved outer surface meshes with the grooved bore of the cam receiver, and a fastener, wherein:
  the fastener is disposed in the bore trough the cam, and
  the fastener engages the bore through the second member.

10. A position-adjustable fastening apparatus, according to claim 9, further comprising a washer, wherein the fastener includes a head and the fastener is disposed through the washer such that the washer is disposed between the head of the fastener and the cam.

11. A position-adjustable fastening apparatus, according to claim 9, wherein the orientation of the cam receiver with respect to the first member and the orientation of the earn with respect to the cam receiver produces a displacement according to the equation:

$$D_T = \left(\left(\sqrt{\left(D_{5D} - \frac{D_{5A}}{2}\right)^2 + \left(D_{5E} - \frac{D_{5A}}{2}\right)^2}\right)\sin\left(\alpha + \tan^{-1}\left(\frac{D_{5D} - \frac{D_{5A}}{2}}{D_{5E} - \frac{D_{5A}}{2}}\right)\right)\right) + R\sin\beta$$

wherein:
  $D_T$=total displacement;
  $D_{SA}$=a dimension of the earn receiver from a first surface to a second surface;
  $D_{SD}$=a distance from the first surface of the cam receiver to a center of the grooved bore defined by the cam receiver;
  $D_{SE}$=a distance from a third surface to the center of the grooved bore defined by the cam receiver;
  α=an angular rotations) position of die cam receiver increasing in a clockwise direction;
  R=a distance from a center of the cam to a center of the bore defined by the cam; sack
  β=an angular rotational displacement increasing in a clockwise direction.

12. A position-adjustable fastening apparatus, according to claim 9, wherein the cam receiver further comprises a flange having a surface proximate the cam, wherein the flange in combination with the fastener is capable of holding die first member proximate the second member.

13. A position-adjustable fastening apparatus, according to claim 9, wherein the plurality of bearing surfaces of the cam receiver further comprises four bearing surfaces that are disposed at approximately right angles from one another.

14. A position-adjustable fastening apparatus, according to claim 9, wherein the plurality of bearing surfaces of the cam receiver further comprises six bearing surfaces that are disposed at approximately 60 degrees from one another.

15. A position-adjustable fastening apparatus, according to claim 9, wherein the second member further comprises at least one reference mark and the first member further comprises a reference feature for indicating a displacement of the first member with respect to the second member.

16. A position-adjustable fastening apparatus, according to claim 9, further comprising an element selected from the group consisting of a fastener and a clamp for holding the first member proximate the second member.

17. A position-adjustable fastening apparatus, according to claim 9, wherein the fastener further comprises a shoulder proximate the bore in the cam.

18. A position-adjustable fastening apparatus capable of maintaining a position of a first member with respect to a second member, the position adjustable fastening apparatus comprising:

a cam receiver disposed in a first bore defined by and extending into the first member, the can receiver including a plurality of bearing surfaces unequally distanced from a center of a grooved bore defined by and extending into the cam receiver, the bearing surfaces being positioned proximate the wall of the first bore;

a cam disposed in the grooved bore of die vain receiver, the vain defining a second bare therethrough and including a grooved outer surface eccentrically spaced from a center of the second bore, the grooved outer surface meshing with the grooved bore of the cam receiver;

a fastener disposed in the second bore defined by the cam and engaged with third bore defined by the second member.

19. A position-adjustable fastening apparatus, according to claim 18, further comprising a washer, wherein the fastener includes a head and the fastener is disposed through the washer such that the washer is disposed between the head of the fastener and the cam.

20. A position-adjustable fastening apparatus, according to claim 18, wherein the orientation of the cam receiver with respect to the first member and the orientation of the cam with respect to the cam receiver produces a displacement according to the equation:

$$D_T = \left(\left(\sqrt{\left(D_{5D} - \frac{D_{5A}}{2}\right)^2 + \left(D_{5E} - \frac{D_{5A}}{2}\right)^2}\right)\sin\left(\alpha + \tan^{-1}\left(\frac{D_{5D} - \frac{D_{5A}}{2}}{D_{5E} - \frac{D_{5A}}{2}}\right)\right)\right) + R\sin\beta$$

wherein:
  $D_T$=total displacement;
  $D_{SA}$=a dimension of the cam receiver from a first surface to a second surface;
  $D_{SD}$=a distance from die first surface of the cam receiver to a center of the grooved bore defined by the cam receiver;
  $D_{SE}$=a distance from a third surface to the center of the grooved bore defined by the cam receiver;
  α=an angular rotational position of the cam receiver increasing in a clockwise direction;
  R=a distance from a center of the cam to a center of the bore defined by the cam; and
  β=an angular rotational displacement increasing in a clockwise direction.

21. A position-adjustable fastening apparatus, according to claim 18, wherein the cam receiver further comprises a flange having a surface proximate the cam, wherein the flange in combination with the fastener is capable of holding the first member proximate the second member.

22. A position-adjustable fastening apparatus, according to claim 18, wherein the plurality of bearing suffices of the cam receiver further comprises four bearing surfaces that are disposed at approximately right angles from one another.

23. A position-adjustable fastening apparatus, according to claim 18, wherein the plurality of bearing surfaces of the cam receiver further comprises six bearing suffices that are disposed at approximately 60 degrees from one another.

24. A position-adjustable fastening apparatus, according to claim 18, further comprising an element selected from the group consisting of a fastener and a clamp for holding the first member proximate the second member.

25. A position-adjustable fastening apparatus, according to claim 18, wherein the fastener further comprises a shoulder proximate the second bore.

* * * * *